Feb. 6, 1951 R. S. OSS 2,540,990
FISH CLEANING DEVICE
Filed Dec. 1, 1947 5 Sheets-Sheet 1

INVENTOR.
Ragnvald S. Oss
BY Geo Stevens
atty.

INVENTOR.
Ragnvald S. Oss
BY Geo Stevens
atty.

Feb. 6, 1951 R. S. OSS 2,540,990
FISH CLEANING DEVICE
Filed Dec. 1, 1947 5 Sheets-Sheet 5

INVENTOR
Ragnald S. Oss
BY Geo Stevens
ATTORNEY

Patented Feb. 6, 1951

2,540,990

UNITED STATES PATENT OFFICE 2,540,990

FISH CLEANING DEVICE

Ragnvald S. Oss, Duluth, Minn., assignor to Oss Fish Splitting Machine Company, Duluth, Minn., a firm Application December 1, 1947, Serial No. 788,995

10 Claims. (Cl. 17—2)

This invention relates to fish cleaning machines and has as its principal object the provision of such a machine which is more efficient and less subject to faulty operation than has heretofore been known in the art.

One of the most prevalent defects which has troubled the owners of fish cleaning machines is the fact that no adequate means has been provided to catch and hold each fish as it is drawn through the machine for the cleaning operations to be performed thereon. Most machines have catching devices which are just as liable to miss the fish as catch it, and if caught, the fish may be pulled loose therefrom during the operations as they are performed, many of which require a strong grip on the fish.

To overcome this particular disadvantage I have provided a novel catching means which is carried on a pair of endless chains which insures catching each fish and after it is caught, locks same within the grip thereof and holds the fish in the desired position for the subsequent cleaning operations to be performed. And, in association with the novel catching means, I have provided means for positively insuring that the successive cleaning operations are performed at the proper time when the fish is in the proper position, and a board or carrier on which the fish are individually carried so that the said operations may be readily accomplished.

Another of the disadvantages encountered in ordinary fish cleaning devices is the provision of means for decapitating the fish and then feeding the fish to the machine to be subsequently cleaned and/or filleted. It seems that most devices in use depend more on chance than upon a positive arrangement for insuring proper feeding and positioning of each fish.

Therefore, another object of the invention is to provide novel means for first decapitating each fish in the preferred manner and then so positioning each fish that it may be caught at the right point by the catching means irrespective of the size of each fish.

Another object is to provide a fish cleaning machine which may be arranged to clean fish in a speedy efficient manner, the timing thereof having been obtained whereby 150 fish were cleaned in one minute, this being a material advance in speed to the devices which are in common use.

It has been the policy of most people when cleaning fish to use the head as a means for holding same due to its largeness and supposed better adaptability therefore. In my device I decapitate the fish first and then feed fish to the machine tail first for the cleaning operations, my holding means being more readily adaptable to such operation, and also, the fish guides and cleaning devices operate more efficiently in that direction.

Another object is to provide a fish cleaning machine which may readily be supplied with additional accessories for performing added operations on fish, such as scaling, boning, or the like without necessitating a complete remodeling of the device to accommodate same.

Another novel accomplishment of the instant device is that the fish are held for decapitation so that the line of severage is at an angle from just rearwardly of the pectoral fins forwardly to the top of the head, thereby getting rid of said fins in the initial operation without losing any of the most desirable portions of the flesh of the fish.

These and other objects and advantages will become more apparent as the description of the invention progresses.

In the accompanying drawings forming a part of this application.

The initial operation of the instant machine is to cut off the heads of each fish and then transport the be-headed fish to a point where they may be caught to be held and drawn through the rest of the machine to have other operations performed thereon.

Figure 1:
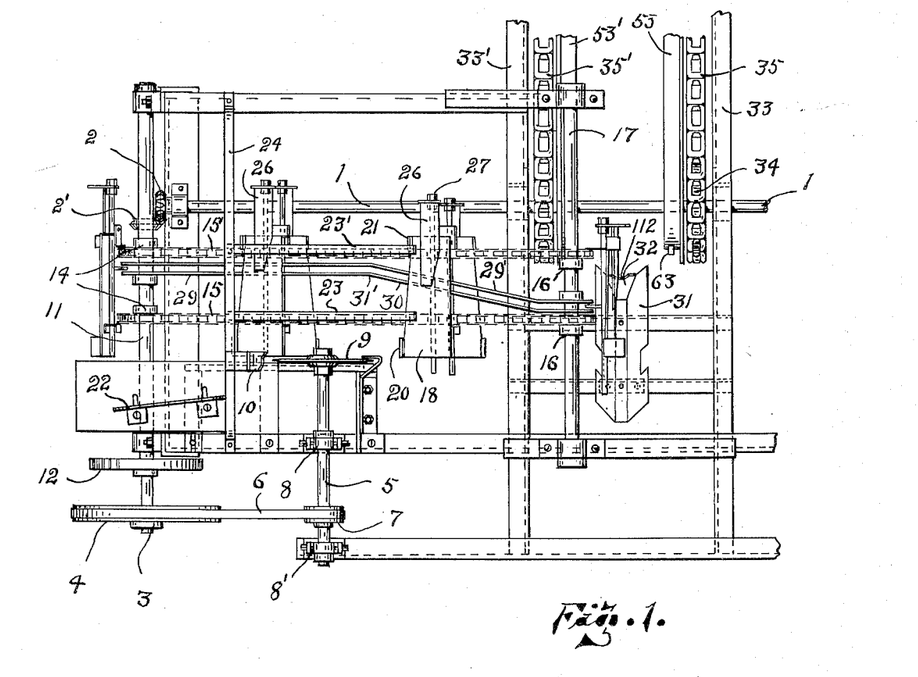
Fig. 1 is a top plan view of the head cutting and fish positioning portion of my fish cleaning machine with parts broken away.
Figure 2:
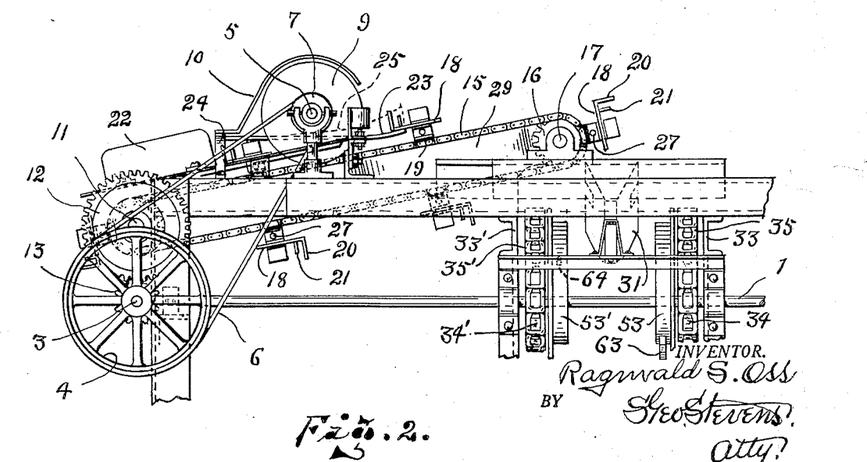
Fig. 2 is a side elevational view of Fig. 1.

Figures 1 and 2 of the drawings illustrate the head cutting and fish positioning device. The reference numeral 1 indicates the drive shaft for this portion of the machine, which drives, by means of bevel gears 2—2', a shaft 3 which extends at right angles to the drive shaft 1, all being carried by a suitable framework, preferably as shown.

At one outer end of the shaft 3 is a pulley 4 which drives a cutter shaft 5 by means of a V-belt 6 and a small pulley 7 fixed to the shaft 5. The shaft 5 is suitably journalled as at 8—8' and carries at its inner end a circular cutter blade 9 which is rotated at relatively high speed due to the size of the pulleys 4 and 7. A suitable guard 10 is provided over the upper portion of the blade 9 to prevent the operator of the machine from being injured thereby, but which will permit the fish to travel thereunder to be be-headed as they pass.

Journalled on the framework slightly above the shaft 3 is a shaft 11 which runs parallel to and is driven by the shaft 3 as by the meshed gears 12—13 mounted on the shafts 11 and 3 respectively. Keyed to the shaft 11 are a pair of sprockets indicated at 14 which drive twin endless chain members 15—15' over a similar pair of sprockets 16 rotatably carried by the shaft 17. The chains 15—15' carry a plurality of fish feeding plates 18, upon each of which a fish is placed manually, up the slight incline as shown in Fig. 2 where the cutter 9 cuts off the head of each fish as it passes same. Then each fish is carried on up to be dumped into a positioning trough to be subsequently caught to have other cleaning operations performed thereon.

Each plate 18 comprises a body portion which has suitable lugs 19 for attaching same to the chains 15—15' to be carried thereby, said lugs 19 being either welded or bolted to the chains. The body portion is made preferably of sheet metal and has its head carrying end wider than the tail carrying end. Adjacent the head carrying end is an upstanding stop or backing member 20 and adjacent the tail carrying end is a similar stop or backing member 21 against which the back (or front if desired) of the fish are placed when laid on the plates 18.

It is to be noted that the stops 20 and 21 are not in alinement with each other but the stop 21 at the tail carrying end is more forward than the stop 20. This feature insures that each fish will be held at an angle to the cutter as it is carried to have its head cut off. With the back of the fish against the stops 20—21 this will result in the head being cut off just behind the pectoral fins at a forward angle past the gills toward the upper part of the head, thereby getting rid of unwanted pectoral fins and at the same time cutting off the head with the least loss of flesh.

Mounted on the framework in front of the cutter is an angularly disposed guide 22 which positions each fish as it is carried upwardly on the plates 18 as by the head of each fish engaging the guide and being pushed backwardly, each head being cut off at approximately the same place.

There is provided a pair of spring metal holddown arms 23—23' extending forwardly from a transverse support 24 which hold the fish down against the plate as the heads are being cut off, they being of sufficient resiliency to permit of the fish traveling easily thereunder as it progresses upwardly on the plates 18, the arms 23—23' being sprung upwardly as shown in dotted lines at 25 as each fish passes thereunder.

After the head cutting operation has been completed it is desirable to position each fish so that it may be caught and held to have subsequent cleaning operations performed thereupon. This is accomplished by an automatic telescopic positioning plate 26 which is carried at the tail carrying end of each plate 18. The telescoping plate 26 is preferably T-shaped and of sheet metal, one end of the cross arm of the T extending above the plate 26 and the other end extending below. The lower end of said cross arm portion has suitably fixed thereto a rod 27 which extends longitudinally under the body portion of the plates 18 and is slidably carried within suitable openings in the depending lugs 19 which carry the plates 18 on the chains 15—15'.

Fixed to and depending from the sliding rod 27 intermediate of the lugs 19 is a guide 28 which rides or is guided intermediate of a pair of spaced parallel members 29—29' which form a guiding channel 30. As clearly seen in Fig. 1 of the drawing, the members 29—29' are parallel with the chains 15—15' for a substantial distance and then are bent slightly as at 31' at a point opposite to the rear edge of the cutter blade 9 in the direction of the cutter blade, and then, adjacent the shaft 17, the members are again bent to bring them back to parallel relation with the chains 15—15'. The depending guides 28 are always within the channel 30 as the members 29—29' are of sufficient width vertically to extend between the vertical spacing of the chains.

It is to be noted that the stem or major portion of the T-shaped positioning plate 26 lies on top of the plate 18. This provides a frictional contact for the tail portion of the fish to lie on as they are carried by the plates 18 which will be sufficient to move the fish laterally on the plates 18 as the telescopic portion 26 is moved inwardly by action of the guide 28 in the channel 30.

As the chains 15—15' are driven around on their sprockets and fish are laid manually on the plates 18 with their backs against the stops 20—21, the plates 18 carry the fish past the cutter which cuts off the heads. Immediately after the heads have been cut off the guides 28 are guided in the direction of the cutter blade by the angular channel 30, at which time, the telescopic positioning plate 26 is moved in the same direction on top of the plate 18. The fish is, as stated, resting with the tail portion thereof resting on the positioning plate, which results in the fish being moved laterally on the plate 18, there being sufficient contact surface on the plate and the upstanding member of the cross arm to insure the tail of each fish being in substantially the same lateral position, regardless of size, after the plates 18 have been moved to the point where they are carried over the sprockets 16 and the fish are dumped off of the plates 18. The plates 18 continue around on the endless chains 15—15' and the telescopic plate 26 is returned to extended position by the reverse action of the channel 30 on the under side thereof, as is clearly apparent from the drawings, so that when the plates 18 again appear on top they will be ready to receive another fish to be carried up to have its head cut off and be dumped.

As the plates 18 pass over the sprockets 16, the fish are dumped into a positioning or receiving tray 31. This tray is substantially V-shaped and is installed at an incline directly below the place where the fish are dumped from the plates 18, the inclination being downwardly toward the tail of the fish. The tail receiving end of the tray or trough 31 has an upstanding wall 32 with an arcuate cut out 112 in its top edge, and the trough is so arranged that each fish drops thereinto with its tail and a portion of its body protruding outwardly over the wall 32 as indicated in dotted lines Fig. 4. This protruding portion is what is grabbed or caught to pull the fish through the subsequent cleaning operations which are to be performed thereon.

It is to be noted that the head cutting operation and the positioning of the fish takes place from the side of the machine, that is, at substantially right angles to the remaining operations, and that while there is here shown only one head cutting device, the machine now in operation has a similar device, not shown, operating directly opposite to the other which is driven by a lateral extension of the shaft 1, the same being arranged so as to dump the fish into the same receiving trough or tray 31, thereby making it possible for two men to feed the machine without interfering at all with each other's work. The arrangement of the plates 18 and the timing of their dumping would have to be adjusted accordingly, of course.

Disposed at right angles to the feeding and head cutting device is the main channel iron framework 33—33' of the machine, the length of which depends entirely on the number of operations to be performed on the fish. That is, it may be desired to have a scaling device to remove the fish scales, or it may be desired to fillet the fish or any similar operation, and the length of the framework must be of sufficient length to accommodate such operations.

Figure 18:
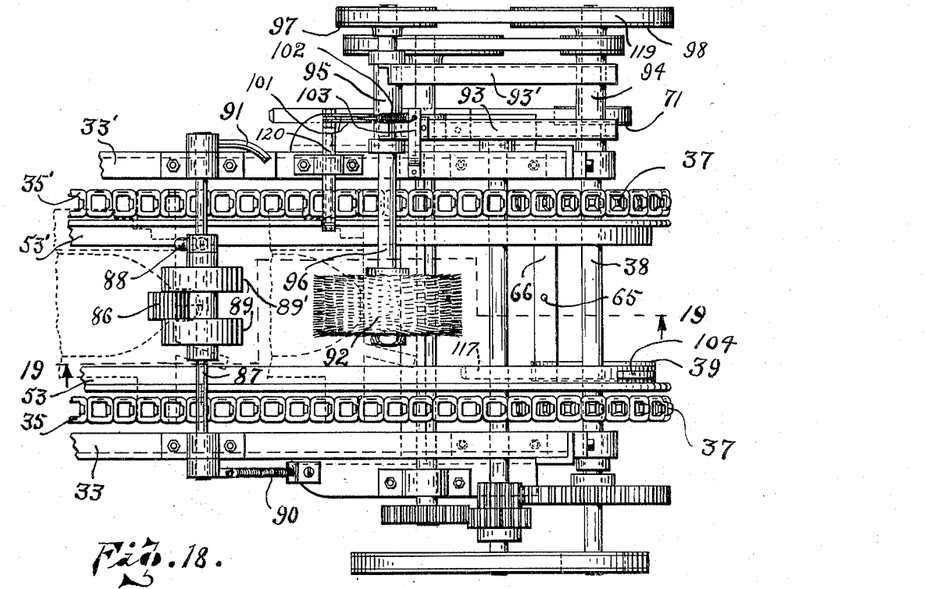
Fig. 18 is a top plan view of the entrail removing portion of the machine.
Figure 19:
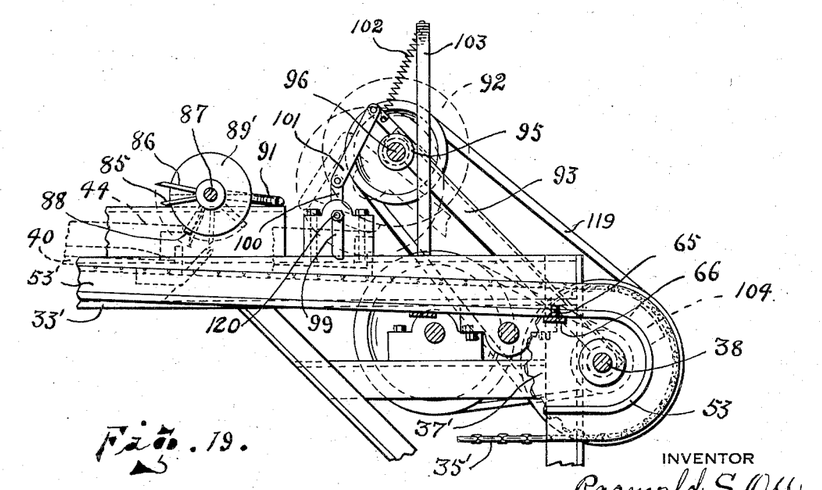
Fig. 19 is a sectional view on the line 19—19 Fig. 18.

Installed on the drive shaft 1 of the head cutting device are a pair of like sprockets 34—34', one adjacent the inner side of each channel iron frame member 33—33', which carry twin endless chains 35—35' the entire length of the machine. As shown in Figs. 18 and 19, the chains 35—35' are carried over a pair of like sprockets 37—37' which are fixed on a transverse shaft 38, this shaft supplies driving power to the chains 35 from a motor, not shown, the pulley indicated at 39 having a V-belt connection 117 to the motor to receive driving power therefrom which is transmitted through a series of reduction gears and pulleys as shown to the shaft 38.

Figures 7, 8, 9, 10, 11:
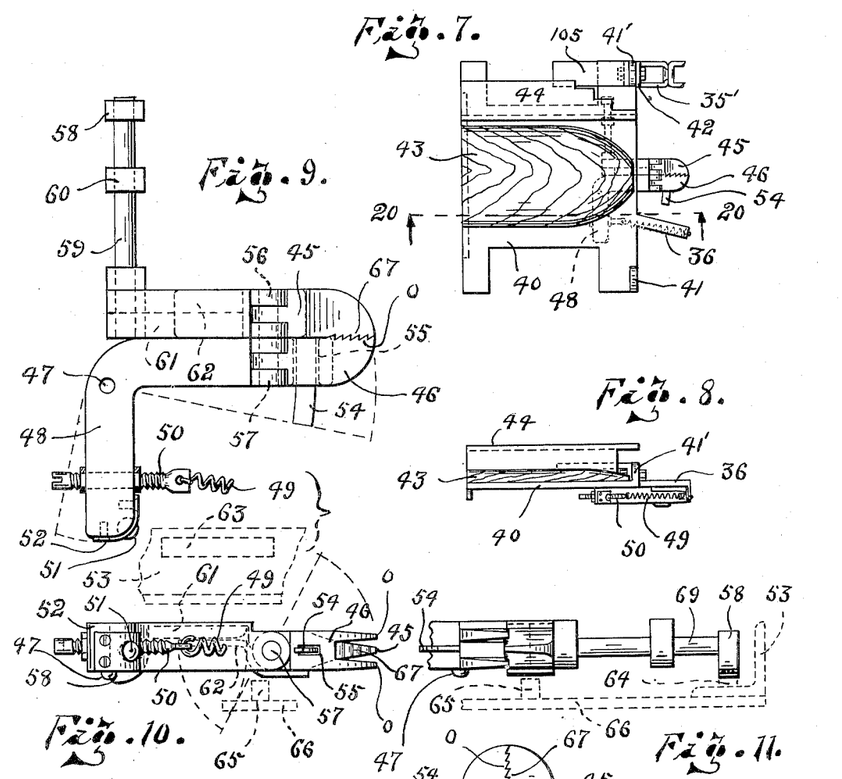
Fig. 7 is a reduced top plan view of one of the fish carriers in its complete form.
Fig. 8 is a side elevational view of Fig. 7.
Fig. 9 is an enlarged top plan view of the fish catching and holding means which is carried on the under side of the fish carriers.
Fig. 10 is a side elevational view of Fig. 9.
Fig. 11 is a broken front elevational view of the jaws of the catching and holding means.

Carried by the chains 35—35' are a plurality of fish carriers or tables such as illustrated in Figs. 7 and 8. These carriers or tables each comprise a main body portion 40, preferably of substantial sheet metal, having lugs 41—41' projecting upwardly from the forward or leading edge thereof which provide the attaching means for the carriers to the chains as by the lugs 42 projecting upwardly therefrom. The lugs 41—42 provide the only attachment of the carriers to the chains, thereby making it possible for the same to travel over relatively small sprockets without interference as is clearly apparent from Figs. 3 and 4 of the drawing.

To the upper surface of each carrier is secured a piece of wood 43 which is suitably shaped to provide a table on which each fish may be carried while the cleaning operations are performed thereon, and which also prevents accidental dulling of tools should they be lowered too far and come in contact with the metal body portion.

Also fixed to the upper surface of each of the carriers is a suitably stepped tripping means 44 which engages cooperative trip levers or the like during the travel of the carrier to bring the cleaning devices into action at the proper instant when the fish is properly positioned for such.

On the underside of the body portion 40 of each carrier is carried the fish catching and holding means, which is clearly illustrated in Figs. 9, 10, 11, 12, and 13 of the drawing. The catching and holding means is composed of two jaws, a fixed jaw 45 and a movable jaw 46 and novel means for operating said jaws as follows: The fixed jaw 45 is fastened to the under side of the body portion 40 in any suitable manner, and the movable or pivotal jaw 46 is pivotally connected at its rearmost end to the under side of the body portion 40 as at 47 to permit lateral swing thereof and has an extension or arm 48 extending laterally therefrom which forms the operating lever for opening or swinging the jaw 46, there being a suitable spring 49 attached to the extension or arm 48 at one end and to an extension 36 of the body portion 40 at the other end to constantly bias the movable jaw 46 toward closed position against the fixed jaw 45. If desired, the spring 49 may be carried at one end by an adjusting screw 50 to permit of selectivity of the action and grip of the pivotal jaw 46.

The outer leading end of the operating extension or arm 48 is rounded off as shown and has a suitable roller 51 mounted therein with a metal plate 52 to hold same in place and also to provide a wearing member for that portion of the arm 48 which is acted upon to operate the movable jaw, there being a suitable trip 63 at one end, and 104 at the other end of the machine which project from the angle iron chain guides 53—53' which the arm 48 engages to open the jaws, the jaws snap closed when the carrier passes beyond the trips.

Extending laterally from the fixed jaw 45 is an arcuately shaped guide or arm 54, and the movable jaw has an arcuately shaped slot 55 extending laterally therethrough through which said guiding arm 54 extends, the arcuate shape of the guide 54 and slot 55 is determined by the position of the pivot 47 as the movable jaw pivots thereon and the guide must not interfere with such pivoting when the jaws are in parallel relation throughout as shown in Figs. 9, 10, 11, and 12.

Another feature of the construction of the catching and holding means is that both of the jaws 45 and 46 are vertically pivotal at a point just rearwardly of the guide 54, each of course having its own pivot pin, 56 and 57 respectively, to permit of such movement.

As shown in Figs. 9, 10, 11, and 13 of the drawings the fixed jaw also carries means whereby the vertical pivoting of both jaws may be controlled or operated to meet the requirements for such during the operation of the machine. This operating means comprises a cam 58 which is fixed to the outer end of a shaft 59 carried by the bracket 60 and a portion of the fixed jaw which are fastened to the under surface of the body portion 40. Extending forwardly from the inner end of the shaft 59 is a lever 61 which is operated by the cam 58, and extending rearwardly from the vertically pivotal portion of the fixed jaw and lying against the lever 61 is an arm 62 which is operated by the lever 61 to pivot both jaws upwardly vertically simultaneously, the guide 54 at this time functioning to vertically pivot the outer end of the movable jaw in conjunction with that of the fixed jaw 45.

The cam 58 is operated as the fish carriers travel around on the chains 35—35' by means of a suitable trip or lug indicated at 64 which is fixed to the angle iron chain guides 53—53' which extend entirely around the machine adjacent each chain 35—35'. When the cam 58 engages the trip 64 the shaft 59 is rocked and the lever 61 is employed to tip the jaws upwardly as indicated in dotted lines in Figs. 10 and 13 and as shown in full lines Fig. 20.

The jaws 45 and 46 are tipped back into horizontal or parallel relation with the body portion 40 by means of a trip 65 which is carried approximately centrally of a transverse bracket 66 adjacent the end of the machine intermediate of the sprockets 37—37', see Figs. 18 and 19. The trip 65 engages the arm 62 which is projecting downwardly as indicated in dotted lines Figs. 10 and 13 and pushes it back into a horizontal position and of course the jaws 45 and 46 are moved in conjunction therewith and at the same time the lever 61 is pushed back into horizontal position.

Figures 12, 13, 20:
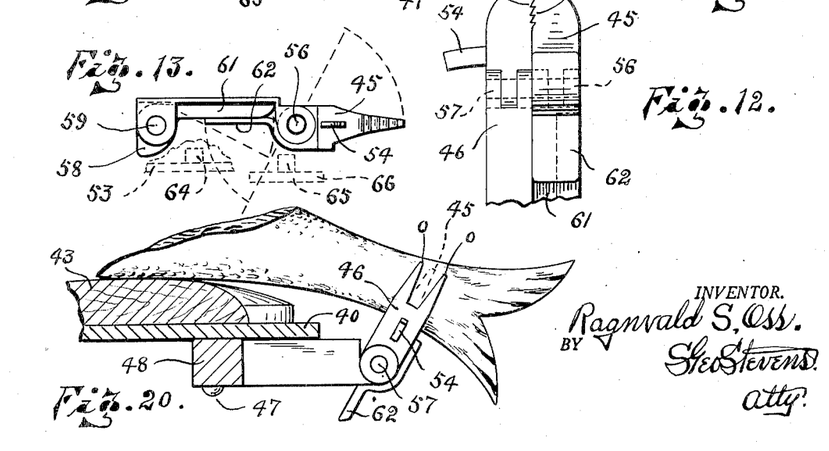
Fig. 12 is a bottom plan view of the jaws of the catching and holding means.
Fig. 13 is an elevational view showing the inner side of the fixed jaw.
Fig. 20 is a sectional view substantially on the line 20—20 Fig. 7 showing the front portion of the fish carrier with the jaws in up-tipped position with a portion of a fish being held therein.

It is to be noted that when the jaws 45 and 46 are in upwardly tipped position as shown in Fig. 20, the same can not be opened by pressure on the arm 48 against the spring 49 due to the fact that the guide 54 is so shaped that opening and closing of the jaws may only be accomplished when the jaws are in parallel relationship throughout their length, the arcuate shape of the guide 54 having been determined by the position of the pivot point 47 when the jaws are in horizontal or parallel relationship throughout.

Figures 3, 4:
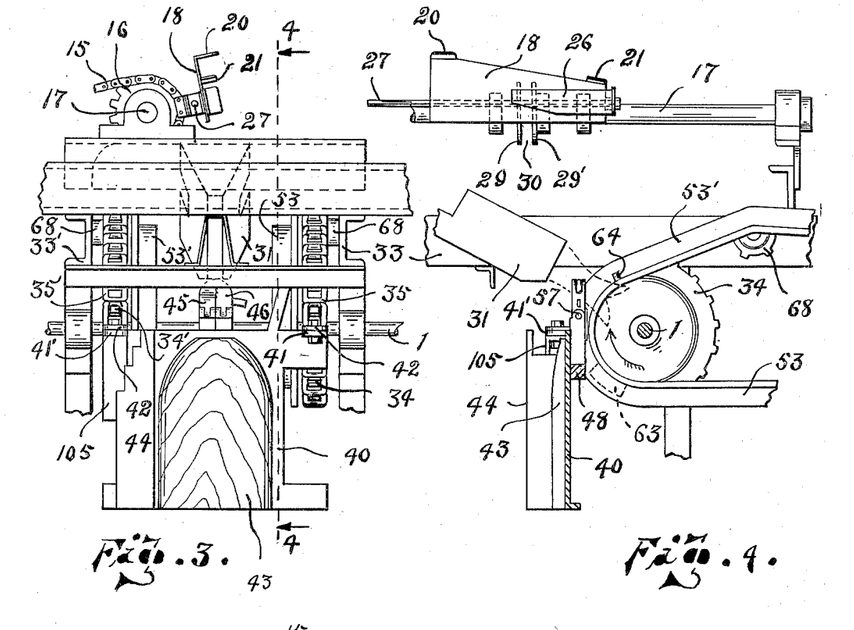
Fig. 3 is a slightly enlarged elevational view of a portion of the machine showing a fish carrier as it would appear upon grabbing a fish from the positioning tray.
Fig. 4 is a vertical sectional view on the line 4—4 Fig. 3.
Figure 5:
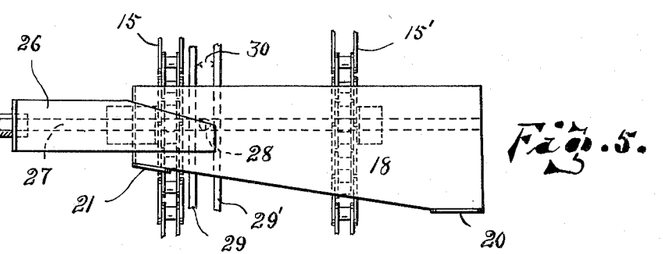
Fig. 5 is an enlarged top plan view of one of the fish positioning devices.
Figure 6:
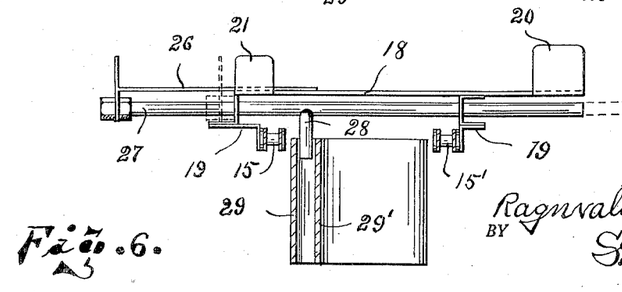
Fig. 6 is a side elevational view of Fig. 5.

As shown in Figs. 3 and 4 of the drawings the fish carriers are carried by the chains 35—35', the direction of travel being indicated by the arrow in Fig. 4. As the carriers move around the sprockets 34—34' the end of the arm 48 engages the trip 63 which is carried on one of the chain guards 53 and as the chains do not stop but travel continuously at uniform speed, the jaws of the carrier are opened. The carrier continues to travel upwardly and the portion of the fish which protrudes from the catching and positioning tray comes in between the open jaws 45—46. As the travel continues the arm 48 moves out of contact with the trip 63 and the jaws snap shut, the teeth O and 67 of the jaws thereby obtaining a firm grip on the tail end of the fish. It is to be noted that the movable jaw 46 is bifurcated laterally to form two separate toothed members O—O while the fixed jaw 45 has but one central toothed member 67 which is approximately centrally of the two toothed members of the movable jaw 46. This arrangement of jaws or toothed members aids materially in obtaining a firm grip on each fish without the need of too much spring tension on the movable jaw 46.

With the fish thus held in the jaws the carriers continue to travel carried by the chains, it being noted that the chains 35—35' travel up a slight incline over small sprockets indicated at 68. This inclined portion is provided to aid in pulling the fish out of the tray 31.

As the carriers travel up the incline, the cam 58 engages the trip 64 and the jaws 45 and 46 are tipped upwardly, the action of the cam being aided somewhat by the drag of the fish as it is being pulled out of the tray. As pointed out above, with the jaws in tipped up position they cannot open due to the guide 54 preventing such action. The fish is then positively gripped by the jaws and is carried along on the carriers by the chains 35—35' with the back thereof uppermost. (The fish having been described as being carried by the positioning plates 18 as being belly foremost, the latter will be on the bottom when the fish are dumped into the tray.)

The next operation to be performed on the fish may be splitting each fish longitudinally to lay it flat on the board 43 of the fish carriers whereby the entrails may be removed and the walls of the cavity thoroughly cleaned.

Figure 14:
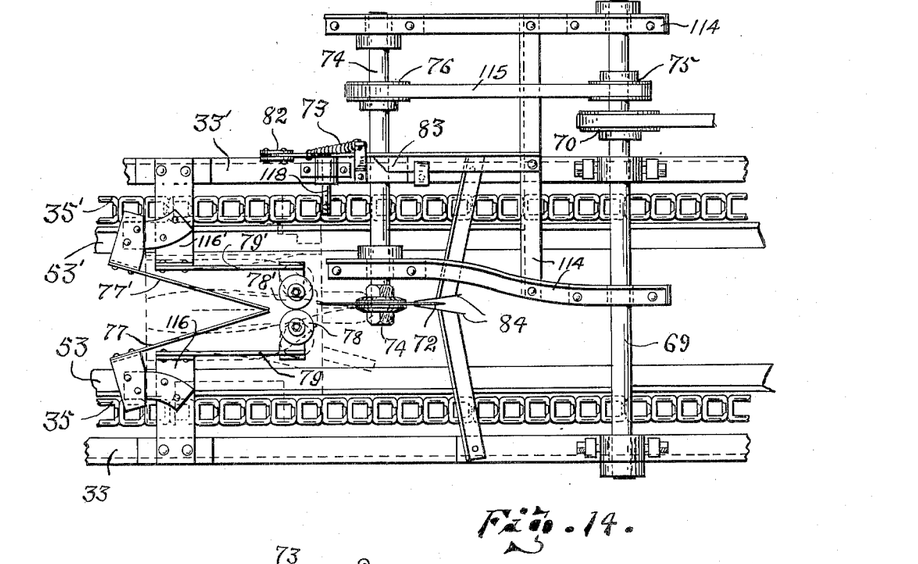
Fig. 14 is a top plan view of the fish splitting portion of the machine.
Figures 15, 16, 17:
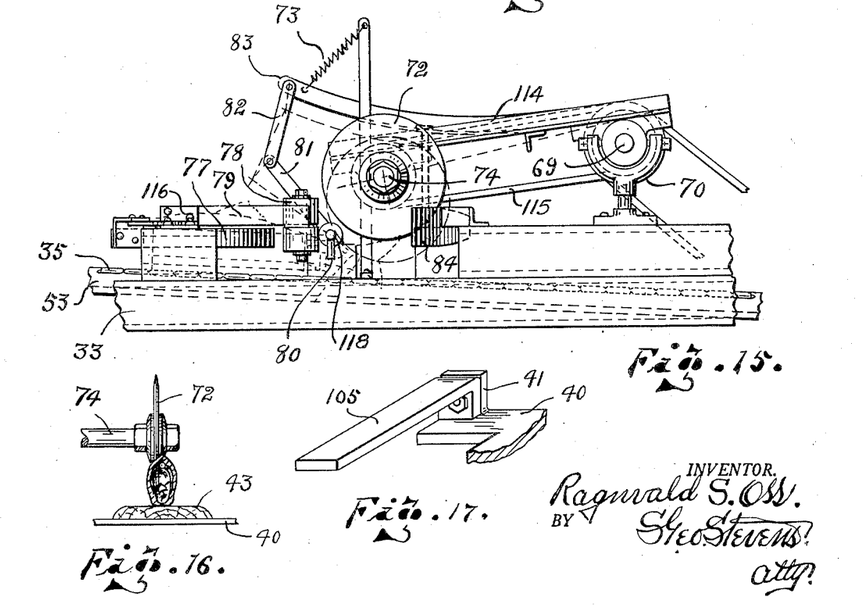
Fig. 15 is a side elevational view of Fig. 14.
Fig. 16 is a front elevational view of the splitting cutter showing a fish as it would appear while being split.
Fig. 17 is an enlarged perspective view of the operating trip for the splitting device.

To accomplish this operation there is provided a splitting and spreading device illustrated in Figs. 14 and 15 of the drawing. The device is supported on the channel iron frame members 33—33' at any desired point.

The driving shaft for the splitting device is illustrated at 69 and has a pulley 70 fixed thereon to receive driving power from the pulley 71 at the rear of the machine as by V-belt. The angle iron frame 114 which carries the rotary cutter blade 72 is vertically pivotally carried adjacent one end on the shaft 69, the frame being normally biased with its outer cutter carrying end upwardly as by a spring 73 carried by a suitable vertical bracket fixed to one of the channel iron frame members 33. The cutter is mounted on a shaft 74 which is rotated as by V-belt drive 115 from the pulley 75 on shaft 69 and pulley 76 on the shaft 74, and is mounted just slightly to one side of the longitudinal center of the machine so as to split each fish just to one side of the back bone, as clearly illustrated in Fig. 16.

After each fish has been caught by the jaws of the catching device it is carried along by the fish carriers on the chains 35—35' towards the splitting device. Just before reaching the cutter the fish are engaged by a pair of spring steel guides 77—77' which stand the fish upright on the boards 43 for splitting, and then by a pair of rollers 78—78' which are mounted on spring steel arms 79—79', the rollers further aiding in holding the fish in the desired position for the cutter 72 to act thereon. The arms 79—79' are carried on angle brackets 116, as shown.

As the fish approaches the cutter, the tripping means 105 carried by the fish carrier engages a depending trip or crank arm 80 which is the short arm of the bell crank lever 118 which is pivotally carried on one of the channel irons of the framework and extends inwardly and downwardly therefrom. By means of the arm 81, which is the long arm of the bell crank lever, and the link arm 82, which is connected intermediate of the arm 81 and a projecting lever 83 which is fixed to the angle iron frame which supports the cutter 72, the rotating cutter is brought down against the fish whereby same is split longitudinally along the back bone as the fish is carried along on the carrier.

As the fish is drawn through the cutter 72 it is spread and laid flat on the carriers by means of plow-like or V-shaped spreader blades 84 intermediate of which the cutter 72 operates as clearly illustrated in the drawing.

After the fish has been split longitudinally and laid out flat, the entrails are exposed, and of course, it is desired to remove same in a most convenient and efficient manner.

The first thing that is required to properly remove the entrails is to sever the so-called gut-string which is secured to the fish body adjacent the anus so as to release the entrails for removal. This is accomplished by means of a combined cutter and scrapper device illustrated in Figs. 18 and 19 of the drawings.

There are two cutter blades 85 and 86, both of which are fixed to the oscillatory shaft 87 centrally of the longitudinal center of the machine and extend radially therefrom, their cutting edges being spaced slightly apart circumferentially as shown to take care of different lengths of fish. The blades 85 and 86 are normally held horizontally above the plane of the frame work of the device as shown in full lines Fig. 19, they being brought downwardly into operating position in the same manner as was the splitting device above described. The downwardly projecting arm 88 is engaged by the tripping means 44 which rocks the shaft 87, thereby turning the blades down into operating position.

As the blades turn down, the blade 85 first engages the fish (which has been split and laid flat on the fish carrier) adjacent the anus thereof, and in the event that the fish is a short one, the said blade 85 engages and cuts off the so-called gut-string which lies centrally of the split fish. The shaft 87, of course, is turned, by the action of the arm 88 on the flat surface of the tripping means 44, until the blade 86 also engages the fish. If the fish were a long one and the blade 85 had engaged the fish rearwardly of the anus thereof where it could not cut off the gut-string, the blade 86 engages the fish at a predetermined point forwardly of the first blade's contact and cuts off the string, thereby positively insuring the severing of the gut-string adjacent the end thereof. As the fish is moved along on the fish carriers the blade or cutter 86 scrapes along the exposed surface of the fish and removes at least a portion of the entrails.

Simultaneously with the scraping of the fish by the blade 86 the rollers 89—89' rotatably carried on the shaft 87 hold the flattened fish down on the board 43 so that same cannot get out of position. As the fish and carrier pass by the scraping device and the arm 88 no longer is engaged by the flat surface of the tripping means 44, the blades are automatically returned to normal position by the spring 90 which biases the shaft 87 towards rotation in the direction to bring the arm 88 back to normal position, the return movement of the blades being limited by a stop 91 which extends from the outer end of the shaft 87 and engages a portion of the frame of the device.

The final operation is to clean the inner (now the upper and opened) entrail cavity of the fish of any remaining entrails.

This is accomplished by means of a rotary brush 92 which is vertically swingably mounted and operated in a manner similar to the splitting device previously described, there being a pair of angle members 93—93' pivotally mounted at one end by means of a sleeve 94 which is pivotally installed on an outwardly projecting end of the shaft 38 which carries the sprockets 37—37', the upper end of the said angle members having fixed transversely thereof an elongated sleeve bearing 95 which rotatably carries the shaft 96. The brush 92 is installed at the inner end of said shaft 96 over the longitudinal center of the machine while at the opposite end of the shaft a pulley 97 is mounted to receive power as by V-belt 119 or the like from the pulley 98 on the shaft 38.

The lowering of the brush 92 is accomplished by a bell crank lever 120 having one arm 99 which is engageable by the tripping means 44 on the fish carriers with the opposed arm 100 pivotally connected to a link arm 101 which in turn is pivotally connected to the upper end of the brush carrying frame as clearly seen in the drawings. The brush is biased in an upward direction by means of a contractile spring 102 connected at one end to the upper terminus of the said frame and at the other end by an elongated vertical bracket 103 which is fixed to the framework of the machine.

After the brush has been brought down finishing the cleaning of the fish, they are carried to the end of the machine and the brush returns to uppermost position. At the end of the machine, the trip 65 engages the arm 62 and the jaws 45 and 46 are moved to a horizontal position, thereby making it possible for same to open to release the fish.

As the carrier is moved farther along and begins to move over the sprockets 37, the arm 48 engages the trip 104 which is fixed to one of the chain guides 53 and opens the jaws 45—46 thereby releasing the grid on the fish which is dumped or dropped into any suitable receptacle placed at the rear of the machine for that purpose and the fish carriers travel along on the under side of the machine toward the beginning or front end thereof where they again come up to grab a fish as shown in Figs. 3 and 4 and as heretofore described.

Having thus described my invention, what I claim is:

1. In a fish cleaning machine having endless conveyor means which carry fish through cleaning operations, means for catching and holding said fish for cleaning operations to be performed comprising a body portion secured to said conveying means to move therewith, a pair of jaws carried by said body portion adjacent the forward end thereof, one of said jaws being fixed and the other pivotal in relation to each other, means carried by said machine for opening and closing said jaws at predetermined intervals during the travel of said body portion along said conveying means, and both of said jaws being pivotal together at right angles to the swing of said movable jaw to position said fish on said body portion.

2. The structure as set forth in claim 1 and a guiding arm carried by said jaws outwardly of said last mentioned pivotal point to control the opening of said jaws.

3. In a fish cleaning device having a frame and endless conveyor means carried on said frame which carry fish through cleaning operations, means for carrying and holding fish for cleaning operations to be performed thereon comprising a table-like body portion secured to said conveyor means to move therewith, a pair of jaws carried by said body portion adjacent the forward end thereof to receive and hold the tail of a fish, one of said jaws being pivotal to move towards and away from the other one of said jaws in a plane substantially parallel with said body portion, both of said jaws being pivotal upwardly together in a plane at substantially right angles to and outwardly from the pivotal movement of said movable jaw, and an arm carried by said jaws outwardly from the pivotal point for both of said jaws together to control the opening and closing of said jaws in conjunction with the pivotal point of both of said jaws.

4. The structure as set forth in claim 3 and said frame having trips fixed adjacent said conveyor means to open and close said jaws at predetermined intervals during the travel of said carrying and holding means.

5. In a fish cleaning device having a frame and endless conveyor means carried on said frame which carry fish through cleaning operations, means for carrying and holding fish for cleaning operations to be performed thereon comprising a table-like body portion secured to said conveyor means to move therewith, a pair of jaws carried by said body portion adjacent the forward end thereof to receive and hold the tail of a fish, one of said jaws being pivotal laterally from the other of said jaws, both of said jaws being pivotal in a plane at substantially right angles to and outwardly from the pivotal movement of said laterally pivotal jaw, and an arm carried by said jaws outwardly from the pivotal point for both of said jaws to control the opening and closing of said jaws, said pivotal jaw being provided with an operating arm extending laterally therefrom, and said frame having trips fixed adjacent said conveyor means to engage said operating arm to open and close said jaws at predetermined intervals during the travel of said carrying and holding means.

6. The structure as set forth in claim 5 and said frame having trips fixed adjacent said conveyor means to pivot said jaws upwardly together to prevent the opening of said jaws in conjunction with said arm while cleaning operations are performed, and to pivot said jaws back to normal position for opening after the cleaning operations are performed.

7. In a fish cleaning device having a frame and endless conveyors which run over sprockets at each end, a fish positioning trough adjacent one end of said conveyors in substantial alinement therewith in which fish are placed with their tails protruding therefrom toward said conveyors, fish carrying tables secured to and carried by said conveyors to carry fish through cleaning operations to be performed as they travel along said conveyors, cooperative jaws carried at the forward end of said tables to grasp and hold fish, said jaws being biased to closed position, a trip fixed to said frame adjacent the end of said conveyor adjacent said trough to open said jaws as said tables travel with said conveyors upwardly over said sprockets whereby said jaws are open and receive the protruding tail of a fish from said trough as they pass the latter, and said trip being of such length as to permit said jaws to close on said tail before said tables pass thereby.

8. The structure as set forth in claim 7 and said jaws being pivotal upwardly together to hold said fish on said table.

9. The structure as set forth in claim 8 and means for preventing the opening of said jaws when in upwardly pivoted position.

10. The structure as set forth in claim 8 and a trip on said frame adjacent said conveyors to pivot said jaws upwardly after they have closed on the tail of a fish.

RAGNVALD S. OSS.

REFERENCES CITED

The following references are of record in the file of this patent:

UNITED STATES PATENTS

| Number | Name | Date |
| --- | --- | --- |
| 249,663 | Palson | Nov. 15, 1881 |
| 676,073 | Munn et al. | June 11, 1901 |
| 1,885,829 | Hunt | Nov. 1, 1932 |
| 1,967,228 | Drevitson | July 24, 1934 |
| 1,967,229 | Drevitson | July 24, 1934 |
| 2,304,880 | Brown et al. | Dec. 15, 1942 |
| 2,322,831 | Danielsson | June 29, 1943 |
| 2,353,654 | Danielsson | July 18, 1944 |